June 29, 1937.   O. R. TAUTENHAHN   2,085,279
ROTARY RECIPROCATING WELL DRILL
Filed Jan. 10, 1935   8 Sheets-Sheet 1
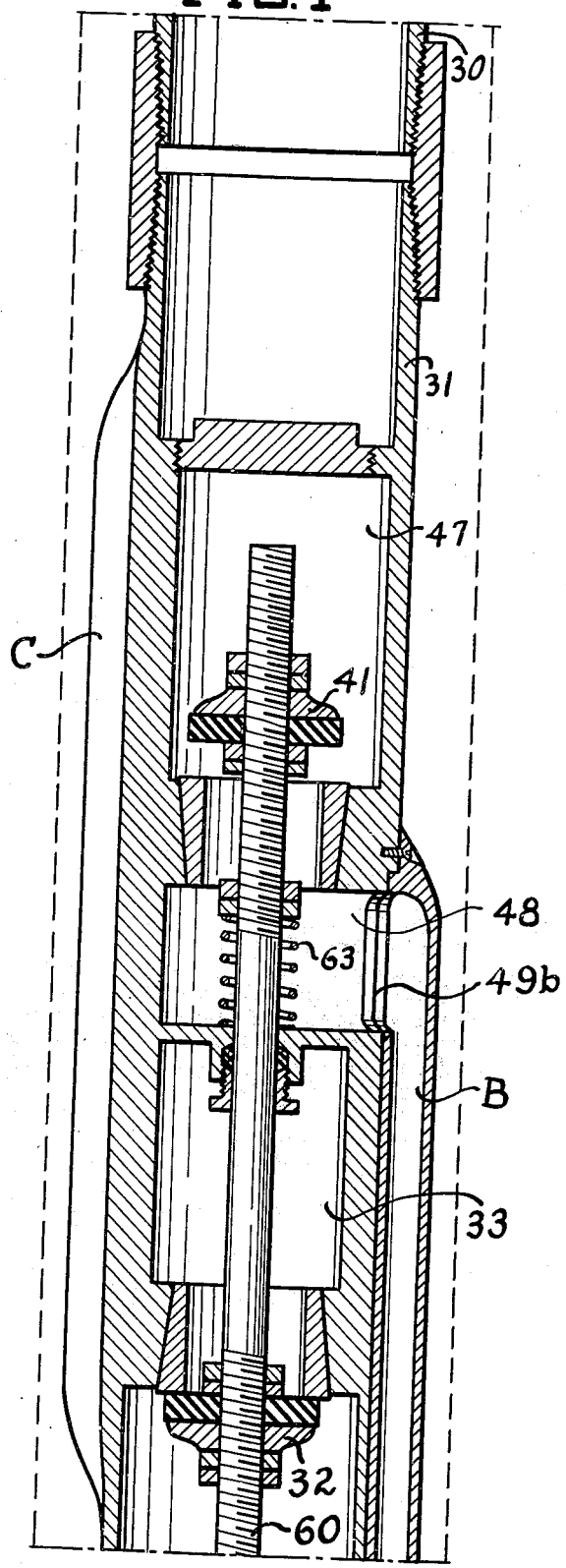
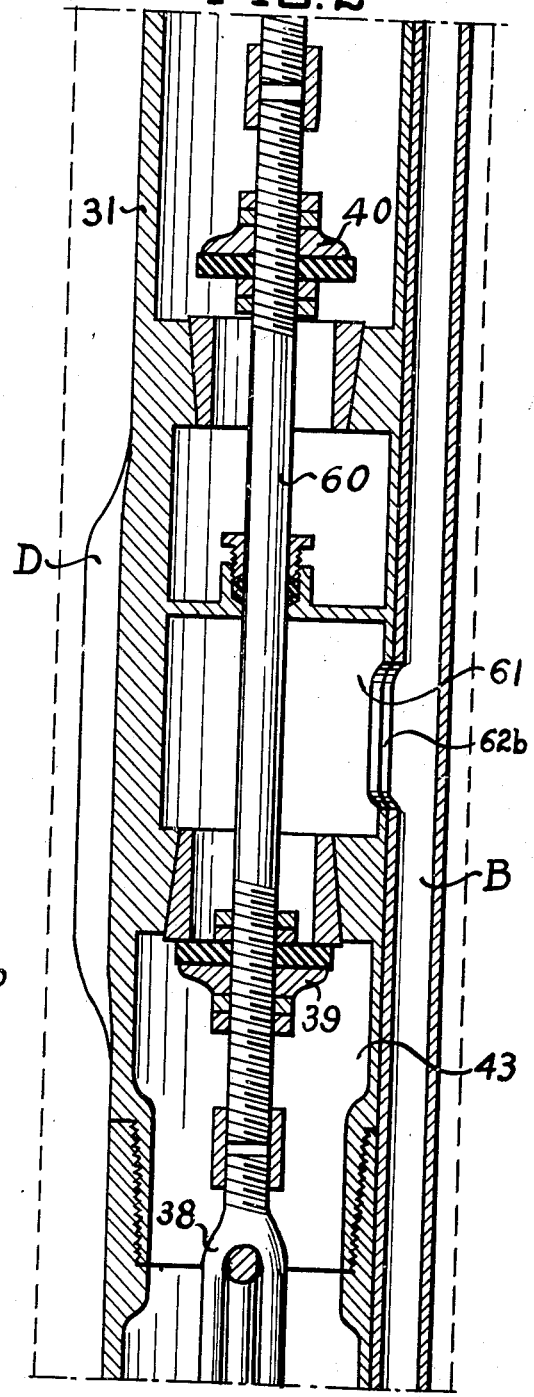
INVENTOR.
Otto R. Tautenhahn
BY Van Buren Hillyard
ATTORNEY.

June 29, 1937. O. R. TAUTENHAHN 2,085,279
ROTARY RECIPROCATING WELL DRILL
Filed Jan. 10, 1935 8 Sheets-Sheet 2
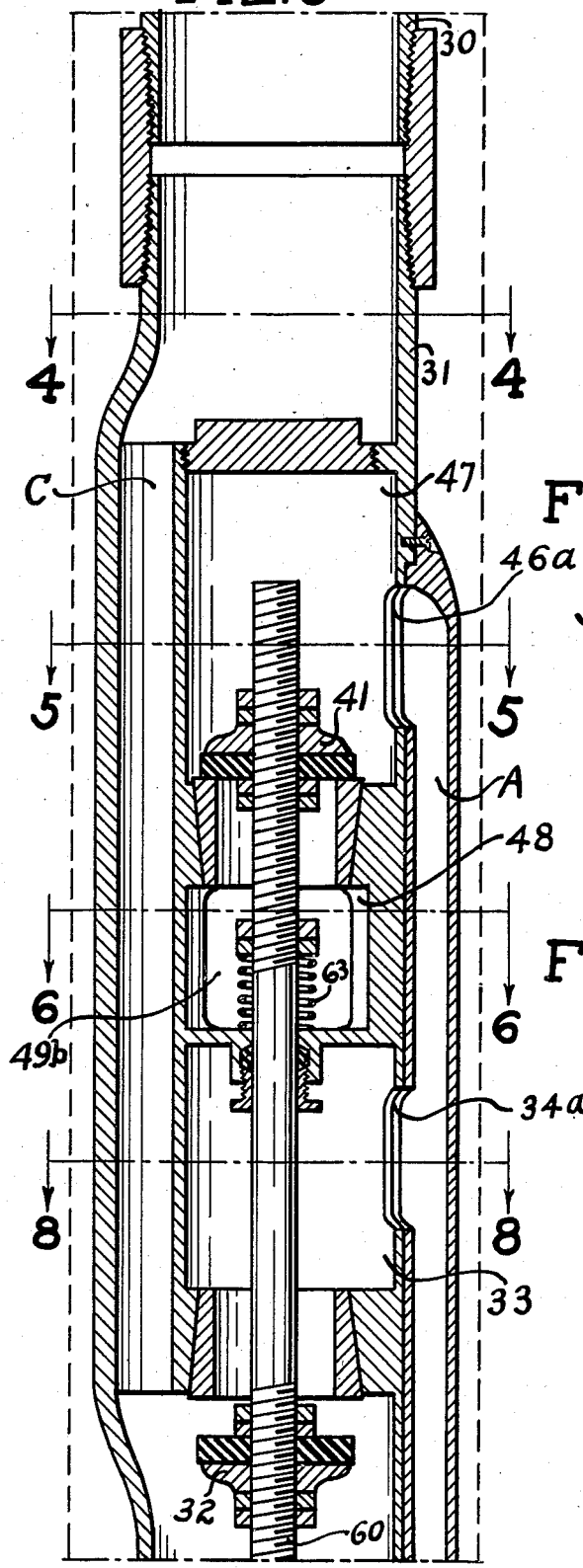
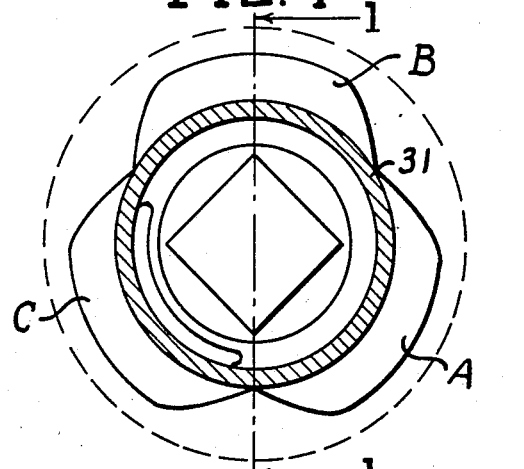
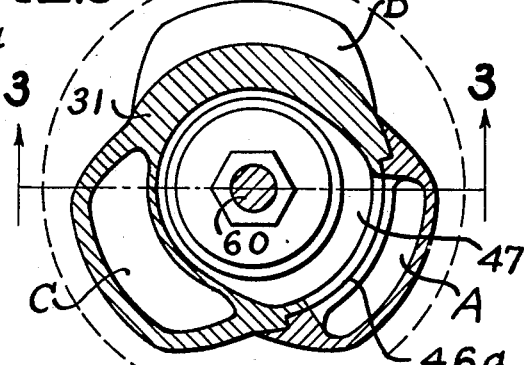
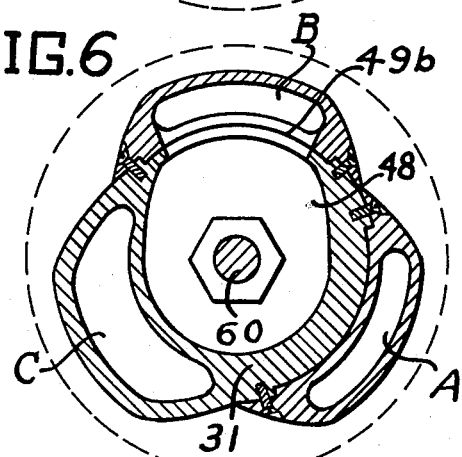
INVENTOR.
Otto R. Tautenhahn
BY Van Buren Hillyard
ATTORNEY.

June 29, 1937.  O. R. TAUTENHAHN  2,085,279
ROTARY RECIPROCATING WELL DRILL
Filed Jan. 10, 1935   8 Sheets-Sheet 3
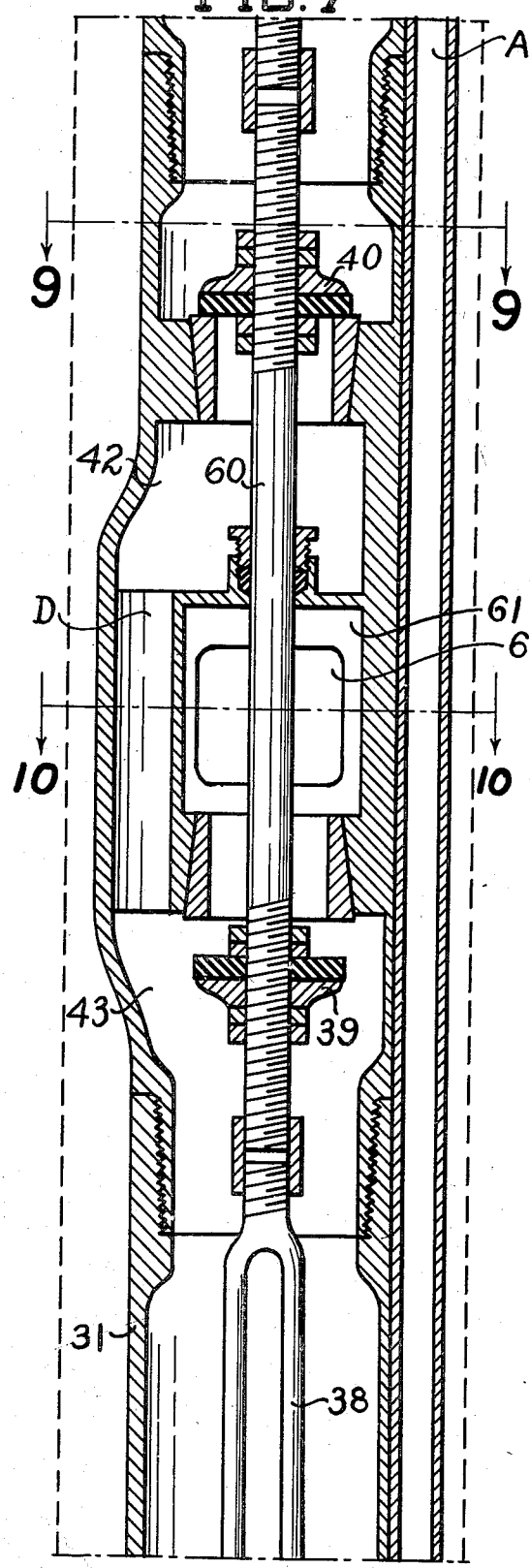
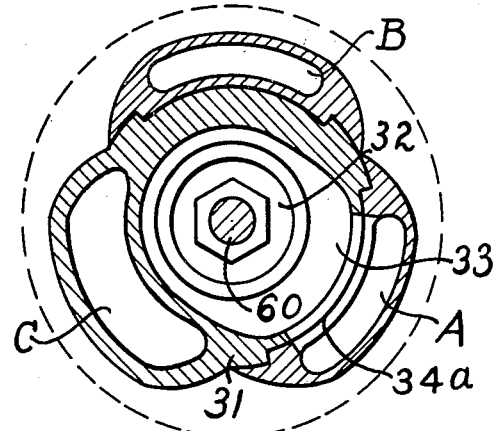
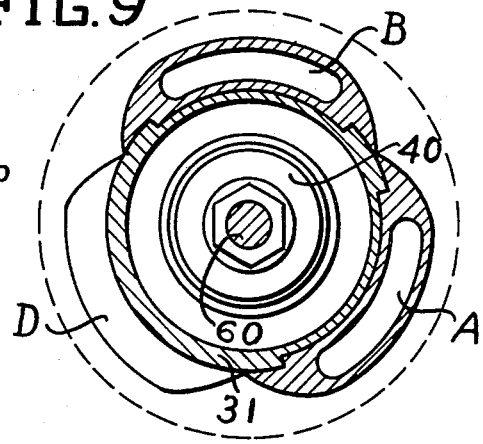
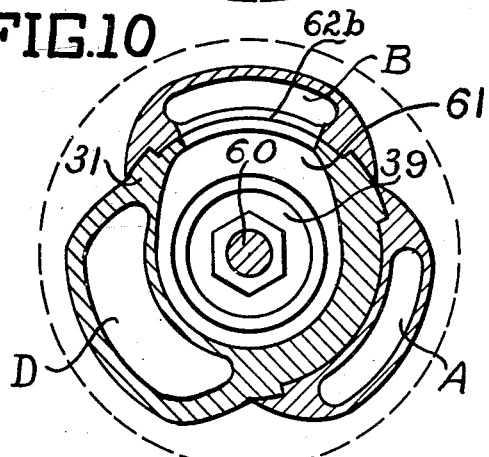
INVENTOR.
Otto R. Tautenhahn
BY Van Buren Hillyard,
ATTORNEY.

June 29, 1937.  O. R. TAUTENHAHN  2,085,279
ROTARY RECIPROCATING WELL DRILL
Filed Jan. 10, 1935   8 Sheets—Sheet 4
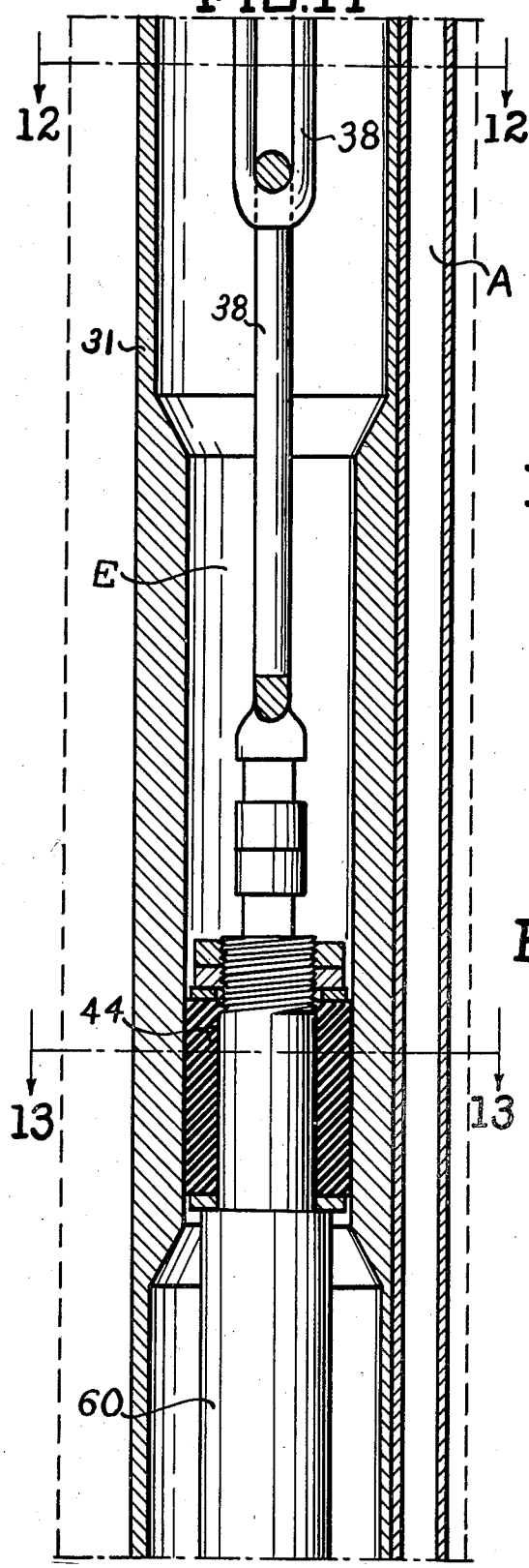
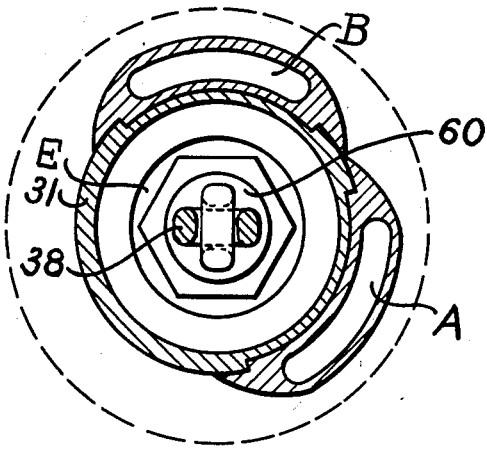
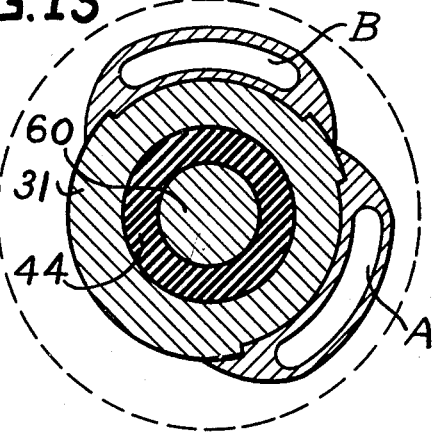
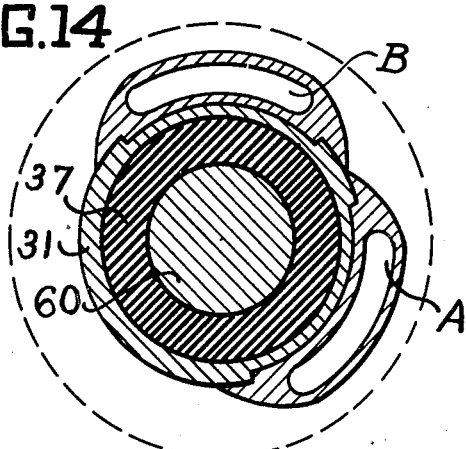
INVENTOR.
Otto R. Tautenhahn
BY Van Buren Hillyard.
ATTORNEY.

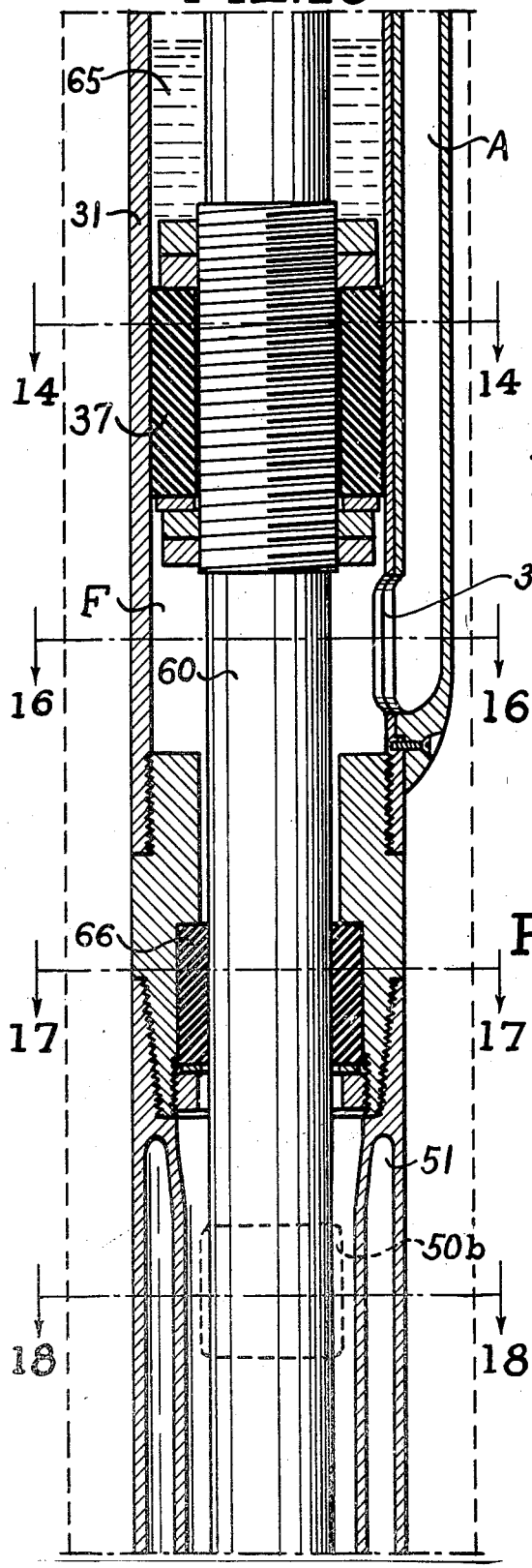
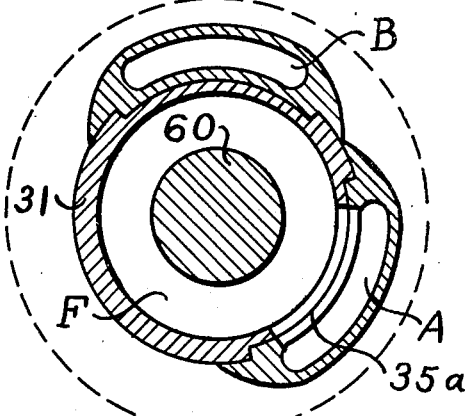
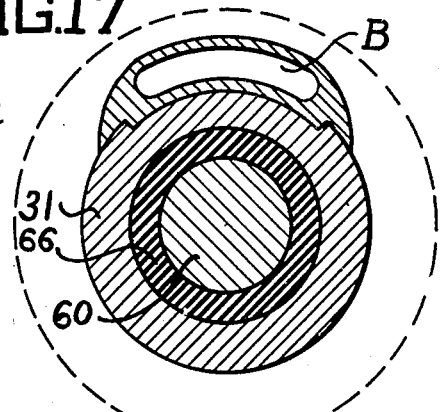
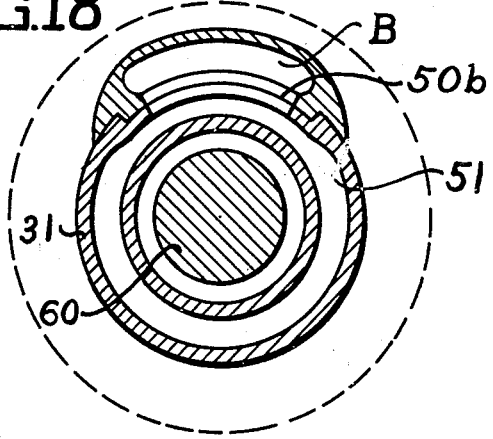

June 29, 1937. O. R. TAUTENHAHN 2,085,279
ROTARY RECIPROCATING WELL DRILL
Filed Jan. 10, 1935   8 Sheets-Sheet 6
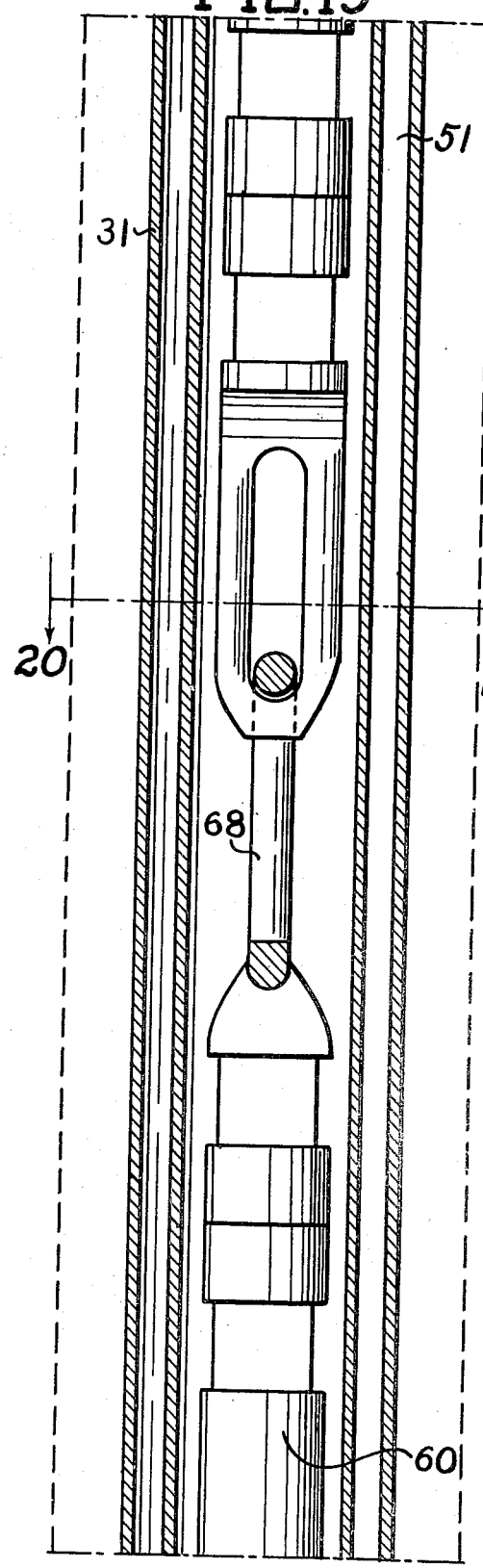
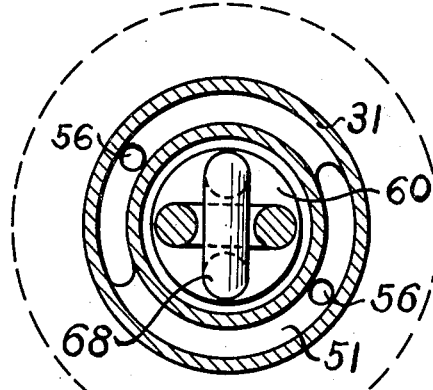
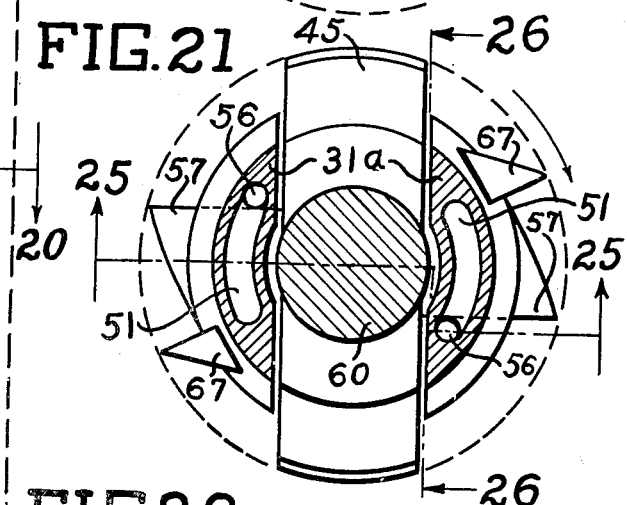
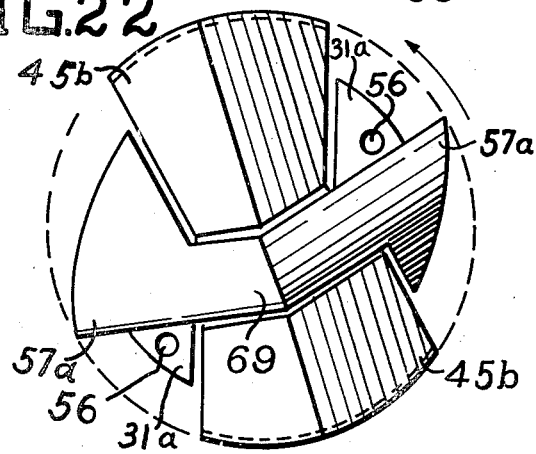
INVENTOR.
Otto R. Tautenhahn
BY Van Buren Hillyard
ATTORNEY.

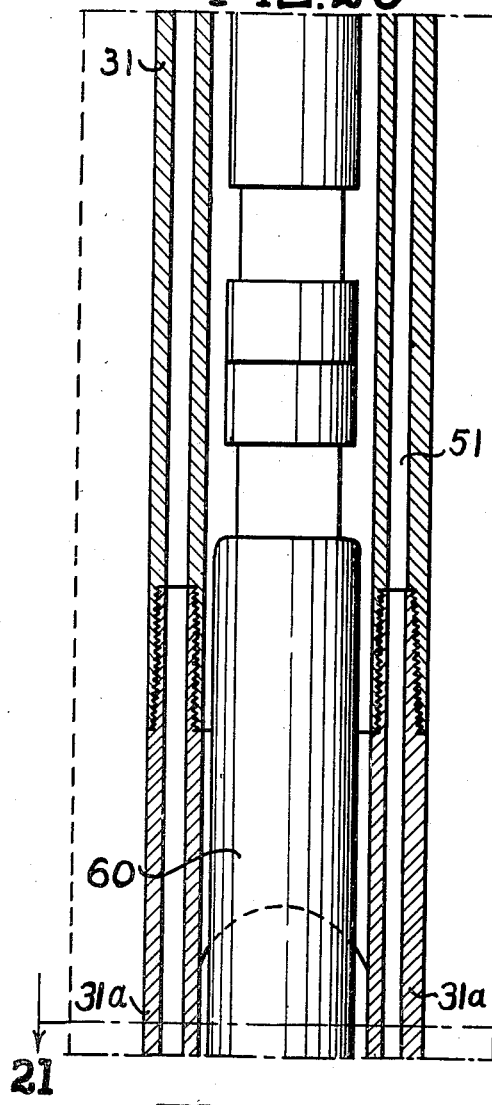
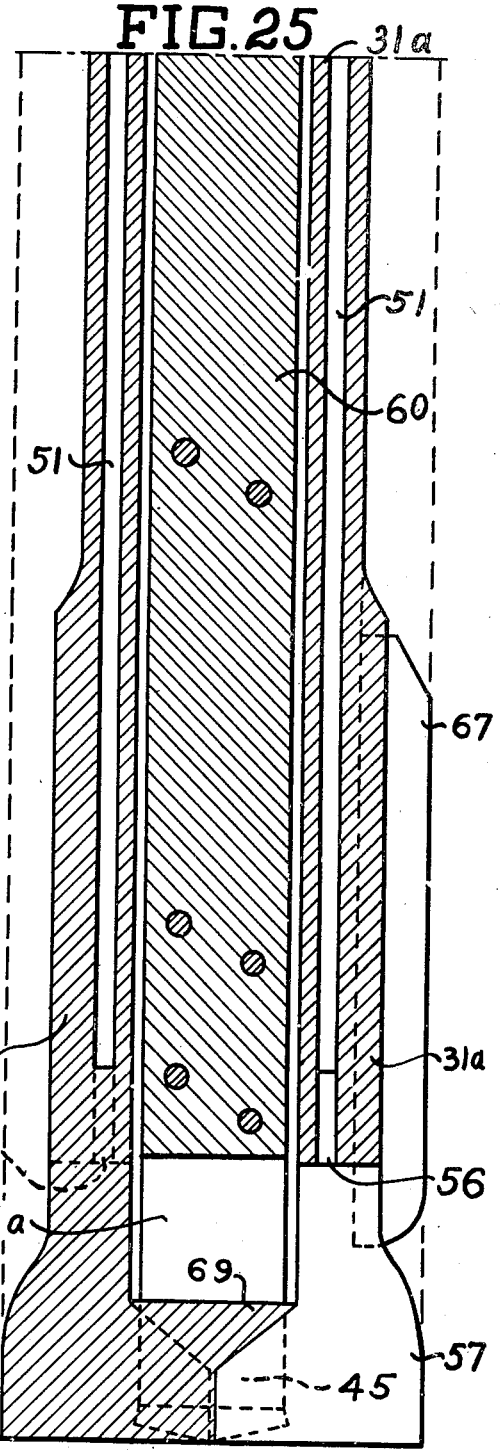
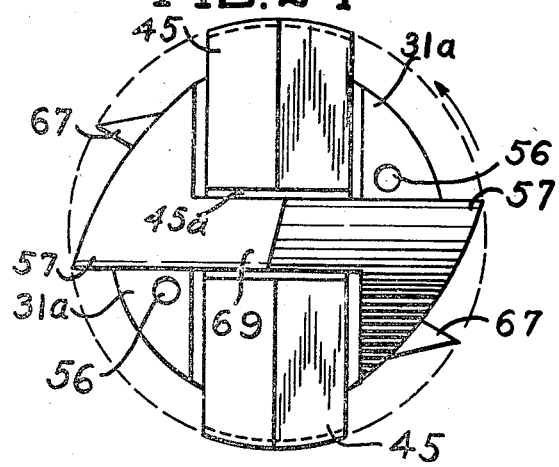

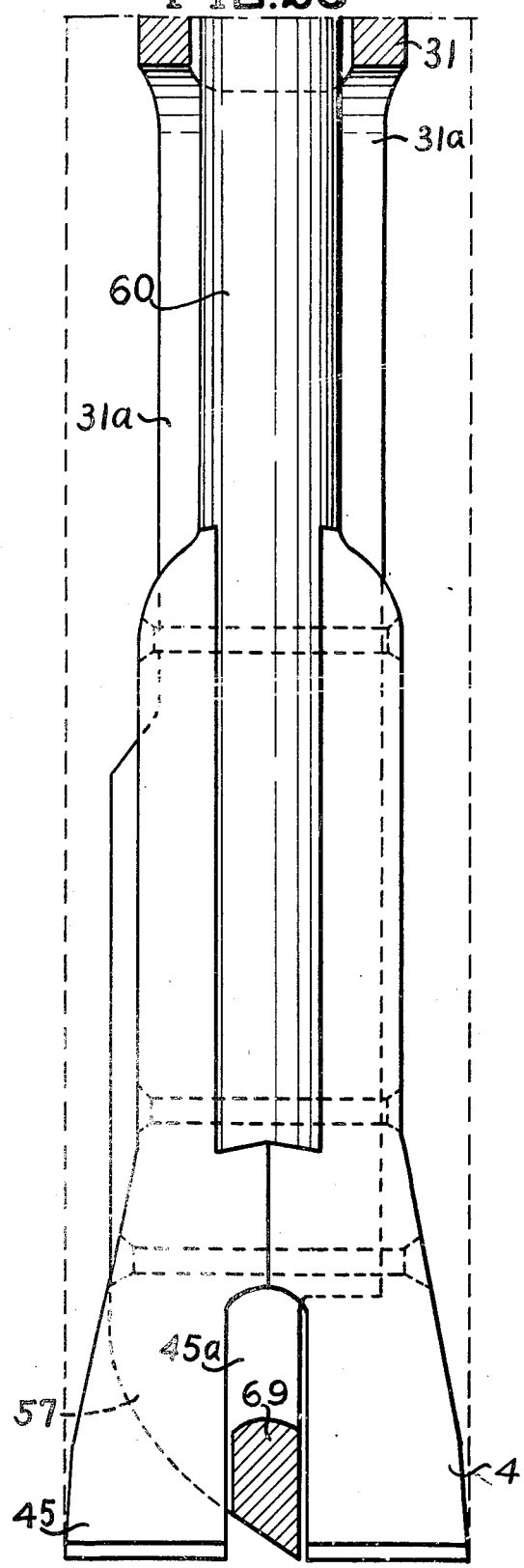
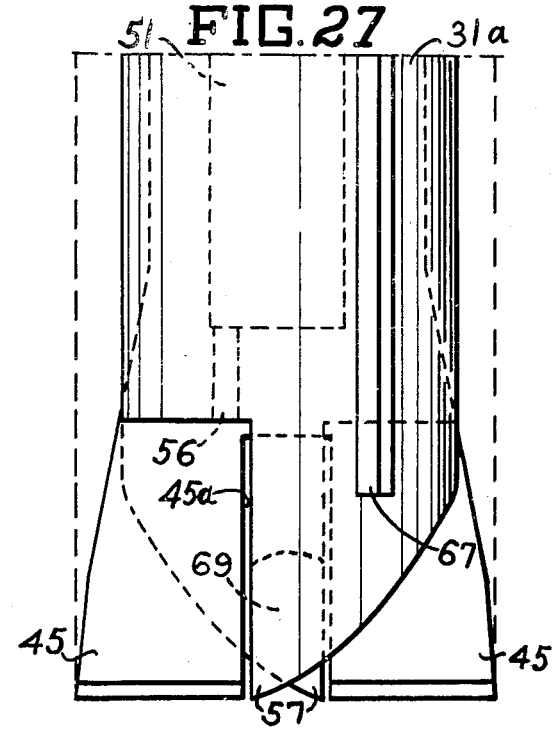
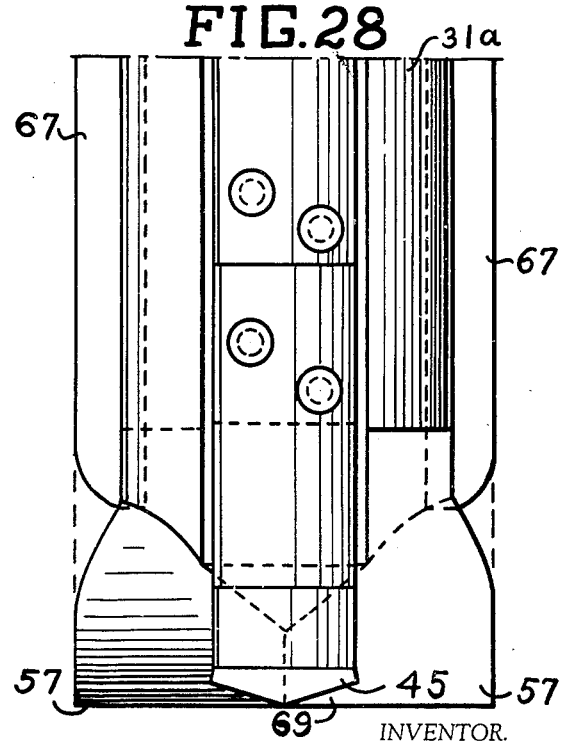

Patented June 29, 1937

2,085,279

UNITED STATES PATENT OFFICE 2,085,279

ROTARY RECIPROCATING WELL DRILL

Otto R. Tautenhahn, Wichita Falls, Tex.

Application January 10, 1935, Serial No. 1,220

14 Claims. (Cl. 255—4)

This invention has for its object the provision of a drill for boring oil, artesian and other deep wells, which will cut rapidly through rock, shale, clay and other formations usually encountered in deep earth boring, and which will clear the openings of cuttings, thereby obviating the necessity of bailing and the consequent delay and expense incident to such step as generally practiced.

A tool of the nature aforesaid embodying the invention contains two cutters which receive a rotary movement, and a motor, preferably fluid operated, carried by and forming a part of the tool and adapted to impart a reciprocating motion to one of the cutters, the inner one, to break up the earth formation so that the cuttings will be carried off by the fluid escaping from the motor and discharged from the well.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings heretoattached, in which:

Figure 1 is a longitudinal section of the upper portion of a well drill embodying the invention on the line 1—1 of Figure 4, the valves being in upward position.

Figure 2 is a sectional view similar to Figure 1, of a portion of the drill next below that shown in Figure 1, the valves being in upward position.

Figure 3 is a sectional view similar to Figure 1, on the line 3—3 of Figure 5, the valves being in downward position.

Figure 4 is a cross section on the line 4—4 of Figure 3.

Figure 5 is a cross section on the line 5—5 of Figure 3.

Figure 6 is a cross section on the line 6—6 of Figure 3.

Figure 7 is a sectional view similar to and in the same plane as Figure 3, the valves being in downward position.

Figure 8 is a cross section on the line 8—8 of Figure 3.

Figure 9 is a cross section on the line 9—9 of Figure 7.

Figure 10 is a cross section on the line 10—10 of Figure 7.

Figure 11 is a sectional view similar to and in the same plane as Figure 3, of a portion of the drill next below that shown in Figure 7.

Figure 12 is a cross section on the line 12—12 of Figure 11.

Figure 13 is a cross section on the line 13—13 of Figure 11.

Figure 14 is a cross section on the line 14—14 of Figure 15.

Figure 15 is a sectional view similar to and in the same plane as Figure 3, of a portion of the drill next below that shown in Figure 11.

Figure 16 is a cross section on the line 16—16 of Figure 15.

Figure 17 is a cross section on the line 17—17 of Figure 15.

Figure 18 is a cross section on the line 18—18 of Figure 15.

Figure 19 is a sectional view similar to and in the same plane as Figure 3, of a portion of the drill next below that shown in Figure 15.

Figure 20 is a cross section on the line 20—20 of Figure 19.

Figure 21 is a cross section on the line 21—21 of Figure 23.

Figure 22 is a view of the drill as seen from the lower end, showing a modified form of bits.

Figure 23 is a sectional view of the adjacent ends of the last two sections of the drill.

Figure 24 is a view similar to Figure 22, showing a different form of bits.

Figure 25 is a sectional view of the bottom portion of the drill on the line 25—25 of Figure 21, looking in the direction of the arrows.

Figure 26 is a sectional view of the lower end of the drill on the line 26—26 of Figure 21 looking in the direction of the arrows.

Figure 27 is a side view of the lower end of the drill showing the broad side of the reciprocating bits.

Figure 28 is a view similar to Figure 27, at a right angle thereto, showing the broad side of the rotary bit.

Corresponding and like parts are referred to in the following description and designated in the several views of the drawings by like reference characters.

The numeral 31 designates the body of the drill, which is preferably of sectional formation for convenience of construction and assemblage, the sections being coupled in any determinate way, as by screw threads. The body is tubular and the opening is formed to provide cylinders E and F, and upper and lower valve chambers. The upper valve chamber comprises spaces 47, 48 and 33. The lower valve chamber comprises spaces 42, 43 and 61. A side passage A connects the upper valve chamber with the lower portion of the cylinder F. Ports 46a and 34a connect the upper portion of the passage A with the respective spaces 47 and 33. A port 35a connects the lower end of the passage A with the cylinder F. A side passage B connects the space 48 with an annular chamber 51 formed in the lower portion of the body 31. A port 49b connects the upper end of the passage B with the space 48. A similar port 62b connects the passage B with the chamber 61. A port 50b connects the lower end of the passage B with the chamber 51. Extensions 31a project from the lower end of the body 31 and are hollow, the spaces connecting with the chamber 51 and having outlets 56 for the discharge of the spent motive fluid.

A shank 60 is disposed within the body 31 and has a limited reciprocating movement therein and comprises sections which are connected in a manner to admit of a given play or longitudinal movement, as by sets of links 38 and 68. A piston 44 is carried by the shank and operates in the cylinder E. A piston 37 of larger diameter is likewise carried by the shank and operates in the cylinder F. The upper portion of the cylinder F is supplied with a lubricant 65 for oiling the pistons and cylinders. Valves 41 and 32, mounted upon the shank 60, close on seats provided at the ends of the upper valve chamber to control the flow of fluid through the ports 46a and 34a. Other valves 40 and 39 carried by the shank 60 coact with seats at the ends of the lower valve chamber to control the flow of fluid through the port 62b and a side passage D connecting the spaces 42 and 43 of the lower valve chamber. A side passage C connects the spaces beyond the ends of the upper valve chamber. These passages D and C are preferably formed in the body 31. The passages A and B are formed by hollow members secured to the sides of the body 31 and fitted in seats provided therein. This is indicated most clearly in the several cross sectional views. These seats are formed in the body after the sections are assembled and coupled, thereby maintaining them in alinement and preventing loosening of the joints. The pistons 44 and 37, while of different diameters, present a uniform area for the action of the motor fluid, hence the load on the motor is equalized and the up and down strokes of the pistons. A packer 66 is located within the body 31 intermediate the ports 35a and 50b to prevent escape of fluid pressure.

A bit 57 is attached to the lower end of the body 31 and may be substantially flat, as indicated in Figure 24, or angling, as shown at 57a in Figure 22. This bit comprises spaced side portions and a connecting cross piece 69 and is bolted or otherwise attached to the extensions 31a. A flat bit 45 is bolted or otherwise attached to the lower end of the shank 60 and its lower portion is cut away, at 45a, to receive and straddle the connecting cross piece 69 of the bit 57. This bit 45 reciprocates and chops the pieces removed by the bit 57. The bits are the full diameter of the opening formed by the drill as indicated most clearly in Figures 24 and 25. In the preferred form, shown in Figure 22, both bits cut from the center outwardly, due to the cross bar 69 being to one side and a side portion of the bit 45 extending from the center outwardly.

In practice, the drill is operated from above ground in any usual or preferred manner, being coupled to a well pipe 30 through which the motor fluid is supplied by a pump or other source under pressure. Both bits are rotatable and the bit 45 receives an independent reciprocating motion to chop up the cuttings of the bit 57 to insure mixture of the fluid therewith to carry them off from the well with the outflowing fluid. When cutting through shale and clay formations, the reciprocating cutter mixes the cuttings with the fluid to insure their discharge. Bailing, as a separate step, is obviated and the work facilitated by the combined action of both sets of cutters and the dual function of the fluid which operates the motor and washes out the cuttings. The body 31 and its bit 57 constitute a rotary cutter. The shank 60 and its bit 45 constitute an auxiliary cutter which reciprocates independently of and turns simultaneously with the rotary cutter. Both cutters coact to the rapid performance of cutting through rock, clay and other formations. Reamer elements 67 are applied to the lower portion of the body 31 for a purpose well understood.

By having the upper sections of the shank 60 coupled by a loose connection, as links 38, the travel of the pistons is determined. The lower loose connection, represented by the links 68, admits of the shank 60 gaining momentum to lift the bit 45 out of sticky formation and on the down stroke it results in the bit 45 being jarred by the impact of the upper portion of the shank dropping thereon. This joint also admits of the bit 45 dropping below the bit 57 to thoroughly break up the formation, even though the piston starts upward before the crotch of the bit 45 strikes the cross piece 69 of the bit 57.

It is assumed that the valves are in downward position, as indicated in Figures 3 and 7, and that the fluid under pressure enters the upper valve chamber through the passage C and open valve 32, thence through port 34a into passage A and from the latter through port 35a into the lower end of cylinder F, driving the piston 37 and shank 60 upward. This results in closing the valves 32 and 39. The links 38 admit of the piston 44 moving upward to discharge any fluid in the cylinder E through the valve 39 and port 62b into the passage B before the valves move upward to close the lower ends of the respective valve chambers. When the valves 32 and 39 close, the valves 40 and 41 open, permitting the fluid to pass into the cylinder E and drive the pistons 44 and 37, which are at their upstroke, downward. The piston 37 in its down stroke forces the fluid from the lower portion of the cylinder F through the port 35a into the passage A, thence upwardly and through the port 46a into the space 47 and through the open valve 41 into the space 48 and through port 49b into the passage B. The fluid again changes its flow by reason of the closing of the valves 40 and 41 and the opening of the valves 32 and 39, and enters the space 33 through the open valve 32, thence through port 34a into passage A and into lower end of cylinder F through port 35a, driving the pistons 37 and 44 upward. The linkage 38 allows for the play necessary to the proper working of the valves. The spent fluid escapes from the passage B through the outlets 56 adjacent the bits and mixing with the cuttings washes them through the opening being bored to the top of the well. A helical spring 63 is associated with the shank and counterbalances the load.

Having thus described the invention, what I claim is:

1. A drill of the character specified comprising a rotary cutter, a shank comprising sections having a limited longitudinal play, an auxiliary cutter carried by the lower shank section, and a fluid motor mounted on the rotary cutter and connected with the upper shank section to impart a reciprocatory movement thereto, the parts being arranged to admit of the auxiliary cutter receiving a simultaneous rotary reciprocatory movement and a limited longitudinal play to allow for a jarring action.

2. A drill of the character specified comprising a rotary cutter, a shank comprising sections having a limited longitudinal play, an auxiliary cutter carried by the lower shank section, and a fluid motor associated with the rotary cutter and including a piston and valves mounted upon said shank to impart a reciprocatory movement thereto, the parts being arranged to admit of the auxiliary cutter receiving a simultaneous rotary reciprocatory movement and a limited longitudinal play to allow for a jarring action.

3. A drill of the character specified comprising a rotary cutter, a shank comprising sections having a limited longitudinal play, an auxiliary cutter carried by the lower shank section, and a fluid motor associated with the rotary cutter and including a piston and valves mounted upon different members of the shank to impart a reciprocatory movement thereto, the parts being arranged to admit of the auxiliary cutter receiving a simultaneous rotary reciprocatory movement and a limited longitudinal play to allow for a jarring action.

4. A drill of the character specified comprising a body provided with a cylinder and connecting valve chamber and adapted to receive a rotary movement, a bit rotatable with the body, a shank mounted within the body and rotatable therewith, a bit carried by the shank, a piston mounted on the shank within said cylinder, and valves carried by the shank for controlling the flow of fluid through the valve chamber and cylinder, the parts being arranged to impart a simultaneous rotary reciprocatory motion to the shank and cutter attached thereto.

5. A drill of the character specified comprising a body provided with a cylinder and connecting valve chamber and adapted to receive a rotary movement, a bit rotatable with the body, a shank mounted within the body and rotatable therewith, and comprising longitudinally alined sections having a limited movement, a bit carried by the lower end of the shank, a piston and valves mounted upon the upper portion of the shank, the piston operating within said cylinder and the valves controlling the flow of fluid through the valve chamber and cylinder, the parts being arranged to impart a simultaneous reciprocatory motion to the shank and cutter attached thereto.

6. A drill of the character specified comprising a body provided with upper and lower cylinders and coacting valve chambers, and adapted to receive a rotary movement and provided with a cutter, a shank within the body and rotatable therewith and comprising sections and provided with a cutter, pistons mounted on different shank sections and operable within the respective cylinders, and valves carried by the shank for controlling the flow of fluid through the valve chambers and cylinders, the parts being arranged to impart a simultaneous rotary reciprocatory motion to the shank and cutter attached thereto.

7. A drill of the character specified comprising a tubular body embodying sections coupled by screw threaded joints and including a cylinder and valve chamber, a member extending across the joint formed between adjacent sections and seated in the latter and forming a passage connecting the valve chamber and cylinder, a shank within the body, cutters carried by the body and shank, and a piston and valves mounted on the shank, the body and shank being simultaneously rotatable and the shank adapted to have an independent reciprocatory movement.

8. A drill substantially as herein described comprising concentric members, one member adapted to receive a rotary movement and the other member adapted to receive a simultaneous rotary and reciprocating movement, and bits carried by the members, one of the bits having a portion cut away to provide side portions of unequal length and the other bit having a cross piece passing through and operable in the space of the cut away bit and disposed off center.

9. A drill substantially as specified comprising a body provided with cylinders, valve chambers and coacting fluid passages, a shank in the body, pistons carried by the shank and operable in the respective cylinders and defining an oil chamber for lubricating the pistons and cylinders, the body being rotatable and provided with a cutter, and a bit carried by the shank and adapted to reciprocate therewith and having portions operable on opposite sides of the cutter applied to the drill body.

10. A drill substantially as described comprising a hollow body adapted to be rotated and provided with upper and lower cylinders, corresponding valve chambers and coacting side passages, and having an annular chamber in its lower portion connecting with the exhaust passage, and having hollow extensions connecting with said annular passage and formed with outlets, a sectional shank within the body having adjacent upper and lower sections connected by joints having a limited movement, pistons on the shank operable in the respective cylinders, sets of valves on the shank coacting with the respective valve chambers for controlling the flow of the motor fluid through the several passages and cylinders, and coacting bits attached to the drill body and shank and crossing and having clearance to admit of the bit attached to the shank reciprocating therewith while at the same time rotating with the bit carried by the valve body.

11. A drill of the character specified specified comprising a rotatable tubular body, a shank reciprocable therein, and comprising sections, links connecting the sections to admit of independent longitudinal play, a piston on each of the sections and operable in the body by fluid pressure flowing therethrough, valves on the respective sections of the shank to control flow of the fluid pressure, a cutter carried by the body, and an auxiliary cutter attached to the other shank section.

12. A drill of the character specified comprising a rotatable tubular body including cylinders of different diameters, a sectional shank therein, pistons of different diameters on the respective sections of the shank and operable in the cylinders, valves mounted on the shank sections, and cutters carried by the body and shank.

13. A drill of the character specified comprising a rotatable tubular body having cylinders, valve chambers and passages connecting the cylinders and valve chambers, a shank passing through the cylinders and valve chambers, pistons on the shank and operable in the cylinders, valves mounted on the shank and coacting with said valve chambers, and cutters carried by the body and shank.

14. A drill of the character specified comprising a rotatable tubular body having cylinders, valve chambers and passages connecting the cylinders and valve chambers, a sectional shank passing through the cylinders and valve chambers, links connecting the sections of the shank, pistons and valves on the shank sections, a packer within the body intermediate the valve chambers, and cutters carried by the body and shank.

OTTO R. TAUTENHAHN.